(12) United States Patent
Owen

(10) Patent No.: US 9,944,811 B2
(45) Date of Patent: Apr. 17, 2018

(54) INTERACTIVE COATING FOR END PRINTING

(71) Applicant: Chromatic Technologies, Inc., Colorado Springs, CO (US)

(72) Inventor: Timothy J. Owen, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 86 days.

(21) Appl. No.: 15/085,779

(22) Filed: Mar. 30, 2016

(65) Prior Publication Data

US 2016/0208123 A1 Jul. 21, 2016

Related U.S. Application Data

(63) Continuation of application No. 13/957,216, filed on Aug. 1, 2013, now abandoned.

(60) Provisional application No. 61/678,552, filed on Aug. 1, 2012.

(51) Int. Cl.

| | |
|---|---|
| *C09D 11/50* | (2014.01) |
| *B41M 5/30* | (2006.01) |
| *C09D 5/26* | (2006.01) |
| *B05D 5/06* | (2006.01) |
| *B65D 25/34* | (2006.01) |
| *B41M 5/28* | (2006.01) |

(52) U.S. Cl.
CPC ............... *C09D 11/50* (2013.01); *B05D 5/065* (2013.01); *B41M 5/305* (2013.01); *B65D 25/34* (2013.01); *C09D 5/26* (2013.01); *B41M 5/282* (2013.01); *Y10T 29/49986* (2015.01)

(58) Field of Classification Search
CPC ....................................................... C09D 1/50

USPC ......................................................... 524/161
See application file for complete search history.

(56) References Cited

U.S. PATENT DOCUMENTS

| | | |
|---|---|---|
| 4,307,001 A | 12/1981 | Strazik et al. |
| 4,421,560 A | 12/1983 | Kito et al. |
| 4,425,161 A | 1/1984 | Shibahashi et al. |
| 4,920,991 A | 5/1990 | Shibahashi et al. |
| 5,312,877 A | 5/1994 | Avci et al. |
| 6,139,779 A | 10/2000 | Small et al. |
| 2002/0146954 A1 | 10/2002 | Drees |
| 2003/0127415 A1 | 7/2003 | Carballido |
| 2003/0152778 A1* | 8/2003 | Parekh ................ B32B 15/012 428/423.1 |
| 2006/0093768 A1 | 5/2006 | Parekh et al. |
| 2006/0228498 A1 | 10/2006 | Parr |
| 2011/0226636 A1 | 9/2011 | Petti |

FOREIGN PATENT DOCUMENTS

| | | |
|---|---|---|
| EP | 0357844 | 3/1990 |
| JP | 2002129029 | 5/2005 |
| WO | WO 2005//077665 | 8/2005 |

OTHER PUBLICATIONS

U.S. Appl. No. 61/678,552, filed Aug. 1, 2012.
U.S. Appl. No. 13/957,216, filed Aug. 1, 2013.

* cited by examiner

*Primary Examiner* — Doris L Lee
(74) *Attorney, Agent, or Firm* — Craig R. Miles; CR Miles P.C.

(57) ABSTRACT

Thermochromic coatings are improved by mixing thermochromic capsules with polymer resins in a manner that imparts shelf stability to flowable precursors that may be cured quickly using dodecylbenzenesulfonic acid and/or other acid catalysts to form relatively hard coatings that are capable of withstanding machine operations, such as the operations needed to make beverage can lids, bottle caps, pull tabs and the like.

20 Claims, 1 Drawing Sheet

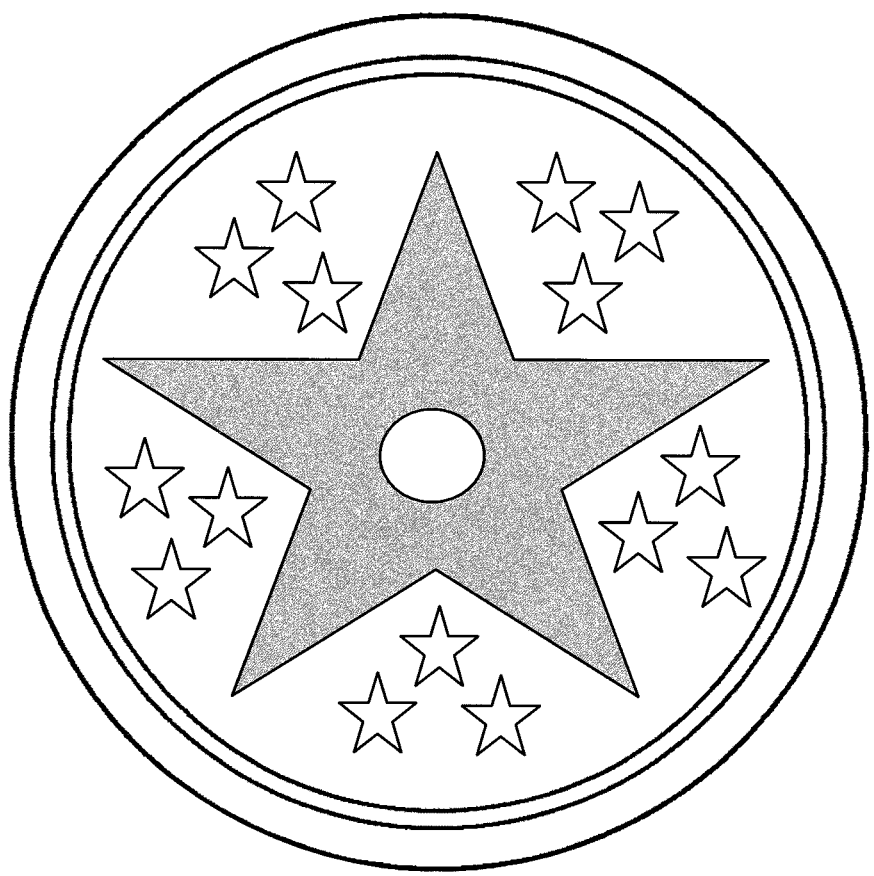

INTERACTIVE COATING FOR END PRINTING

RELATED APPLICATIONS

This United States Patent Application is a continuation of U.S. patent application Ser. No. 13/957,216, filed Aug. 1, 2013, which claims the benefit of U.S. Provisional Patent Application 61/678,552, filed Aug. 1, 2012, each hereby incorporated by reference herein.

BACKGROUND

Thermochromic encapsulated dyes undergo a color change over a specific temperature range. By way of example, a dye may change from a particular color at low temperature to colorless at a high temperature, such as red at 85° F. and colorless at above 90° F. The color change temperature is controllable, such that the color change can take place at different temperatures. In one example, the color change may occur at a temperature just below a person's external body temperature so that a color change occurs in response to a human touch. For those skilled in the art of thermochromic microcapsule synthesis, the precise control of the temperatures at which color changes occurs is easily achievable. For example, the ideal temperature of color change for cool beverages may range from 0° C. to 15° C., while the ideal temperature change for a warm or hot beverage may lie between 40° C. to 65° C.

Thermochromic systems consist of three main components: an electron donating chromophore, an electron-accepting color developer and a non-polar solvent that facilitates color change over a specified temperature range. The properties of thermochromic systems have been exploited for more than 35 years. One technique used to produce the thermochromic encapsulated dye is to combine water, dye, and oil with melamine formaldehyde resin and agitate to create a very fine emulsification. Interfacial tensions are such that the oil and dye end up on the inside of a melamine formaldehyde capsule distributed in primarily the water phase. The melamine formaldehyde substance, while very hard and resistant to breakdown at high temperature, is permeable. Though there has been significant improvement in microencapsulation technology, thermochromic systems still have inherent chemical instability in polar solvent-based systems. For this reason, microencapsulated thermochromic pigments have found limited applicability in solvent-based systems. For example, U.S. Pat. No. 6,139,779, describes how low molecular weight solvents (generally less than 100 g/mol) have been shown to permeate the relatively thin microcapsule wall and destroy the thermochromic system. A variety of thermochromic inks may be purchased on commercial order, for example, from Chromatic Technologies, Inc. of Colorado Springs, Colo.

U.S. Pat. Nos. 4,421,560 and 4,425,161 entitled "Thermochromic Materials" both state that thermochromic inks can be made with "conventional additives used to improve conventional printing inks." Nonetheless, there are concerns over what additives may be added to these inks due to materials incompatibility issues.

Thermochromic dye is often sold in a slurry of pigment, formed of encapsulated dye in a water base. It happens that the pH of this slurry is most often neutral in a range from 6.5 to 7.5. When thermochromic dye is added to a formulation that has a pH outside this range, the color change properties are often lost. This can be an irreversible effect and, therefore, it is important to adjust the pH prior to adding the thermochromic dye.

Several types of ingredients are traditionally added to ink formulations. The combination of all the ingredients in an ink, other than the pigment, is called the vehicle. The vehicle carries the pigment to the substrate and binds the pigment to the substrate. The correct combination of vehicle ingredients will result in the wetting of an ink. This wetting means that the vehicle forms an absorbed film around the pigment particles. The main ingredient in an ink is the binder. This may be a resin, lacquer or varnish, or some other polymer. The binder characteristics vary depending on the type of printing that is being done and the desired final product. The second main ingredient is the colorant itself, for example, as described above. The remaining ingredients are added to enhance the color and printing characteristics of the binder and the colorant. These remaining ingredients may include reducers (solvents), waxes, surfactant, thickeners, driers, and/or UV inhibitors.

Thermochromic inks have been used successfully as indicators of a preferred usage temperature and as a brand differentiator. Specifically, thermochromic inks have been used as cold indicators on aluminum cans, via metal decorating inks, to communicate optimum consumption temperature to the consumer. This interactivity through thermochromic color change so far does not extend to coating on can ends, tabs, caps and closures. To date, no such coatings are commercially available. In part, this is due to significant mechanical forces that are applied to pre-coated coil stock to form can ends, tabs, caps and other closures. Because of the stress and sheer during the tooling process the coating must be flexible and resistant to cracking, flaking, and other damage. In addition, the coating must be sufficiently chemically resistant to be unaffected by pasteurization or other processes. In order to meet the above requirements, the reversible thermochromic coating described herein must contain a thermochromic pigment, a resin, and a commercially available coating commonly used for can and coil coatings. In order to engineer additional coating properties, for example, chemical resistance or flexibility, components such as a curing agent, an accelerator or catalyst to enhance curing, or wax, may be added. Furthermore, thermochromic microcapsule wetting agents may be incorporated to aid pigment dispersion, and one or more solvents may be selected.

Plain lids of the type used in beverage cans are stamped from a coil of aluminum, typically alloy 5182-H48, and transferred to another press that converts the stamped materials into easy-open ends. The conversion press forms an integral rivet button in the lid and scores the opening, while concurrently forming the tabs in another die from a separate strip of aluminum. The tab is pushed over the button, which is then flattened to form the rivet that attaches the tab to the lid. The top rim of the can is trimmed and pressed inward or "necked" to form a taper conical where the can will later be filled, and the lid (usually made of an aluminum alloy with magnesium) attached. The lid components, especially the tabs, may be coated with various coatings for use in can ends, tabs, caps or closures before they are subjected to such manufacturing processes as riveting.

Beverage cans are usually filled before the top is crimped in place. The filling and sealing operations are fast and precise. The filling head centers over the can and discharges the beverage to flow down the sides of the can. The lid is placed on the can then crimped in two operations. A seaming head engages the lid from above, while a seaming roller to the side curls the edge of the lid around the edge of the can body. The head and roller spin the can in a complete circle to seal all the way around. A pressure roller next drives the two edges together under pressure to make a gas-tight seal. Filled cans usually have pressurized gas inside, which stiffens the filled cans for subsequent handling.

United States Patent Application publication number 2003/01274515 A1 describes the use of thermochromic inks to apply printable images to metal lids and caps. United States Patent Application publication number 2011/0226636 A1 describes the use of thermochromic inks as applied in multiple ways to aluminum can ends, the displaceable tear panel and the non-detachable tab. While these disclosures describe the application of thermochromic inks, they do not teach practical means of achieving the claims described. Conventional thermochromic inks are generally unsuited for the manufacturing stresses involved in making the can ends and tabs which, practically speaking, are made from aluminum rolls, commonly known as coil stock, that must be coated prior to the machining operations that form the can ends and tabs. Because of the durability and chemical stability of coatings, they are commonly applied to aluminum and metal cans where direct or indirect food contact may occur. The art does not, however, provide detailed formulations for reversible thermochromic resin systems, for use in can ends, tabs, caps or closures.

It is problematic that existing thermochromic coatings fail to withstand the stresses of these manufacturing operations which may, for example, be excessively thin or scratch the coatings or crush the micro capsules forming the thermochromic pigment.

Prior attempts at printing thermochromic inks on the ends of cans have failed because the inks cured too slowly. Prior attempts to add acid catalysts to quicken the rate of cure have failed because the acid catalysts permanently activate the thermochromic pigment in the inks.

SUMMARY

A coating useful for the printing of thermochromic inks on the ends of cans, "end printing", is disclosed herein. The inks used for end printing cure in less than about 20 seconds. The inks disclosed herein use acid catalysts which catalyze the cure of the ink but which do not activate the thermochromic pigment. The preferred acid catalyst for the thermochromic coating is dodecylbenzenesulfonic acid.

The presently disclosed instrumentalities overcome the problems outlined above and advance the art by providing reversible thermochromic can and coil coatings to fabricate can ends, tabs, caps and/or closures using aluminum or steel alloys. Furthermore, the inventors have discovered processes in the manufacture of the thermochromic microcapsule as well as processing conditions when making the coating that enhance the solvent stability of the thermochromic pigment. Disclosed herein are compositions and methods of use for reducing the curing time of thermochromic inks without activating the thermochromic pigments therein.

The use of thermochromic systems as a substitute for conventional pigments in resin based coatings creates an interactive effect which can provide an indicator or purely artistic effect. In addition to the visual appeal of thermochromic can ends, tabs, caps and closures, they have also a functional purpose indicating the internal temperature of the beverage within the can as, for example, the pigment changes from colorless to colored or from one color to a different color.

In one aspect, a thermochromic coating may include a pigment and a vehicle. The pigment is present in an amount ranging from 1% to 40% of the coating by weight, and the vehicle forms the balance of from 99% to 60% by weight. The pigment may be provided in a slurry form having variable liquid content, so for consistency the weight of pigment is assessed using pigment that is completely dry. For example, pigment that is provided in a water-based slurry would be assessed after elimination of the water, although it is not strictly necessary to eliminate the water when mixing all formulations.

The pigment includes thermochromic microcapsules. These are usually melamine formaldehyde resin encapsulating a core that contains thermochromic system including a leuco dye, a developer and a solvent that controls the color activation temperature of the leuco dye and developer. Other thermochromic systems are known to the art. Methods of forming thermochromic capsules with predetermined activation temperatures are well known in the art. The pigment may also contain dyes or solids that impart color and are not thermochromic in nature.

The vehicle contains a polymerizable resin that contains the pigment and may be, for example, polyester, polyurethane, urethane, acrylic acid and acrylate. These may incorporate curing agents as are known in the art, such as primary, secondary, tertiary, and cyclic aliphatic amines, blocked amines, amino resins with a range of alkylation, aromatic amines, polyamines, polyamides, amidoamines, ketimines, melamine resins, isocyanates or resins that can be cured using ultraviolet radiation.

Curing agents that quicken the cure rate to less than about 20 seconds but do not permanently activate the thermochromic pigments include acid catalysts such as dodecylbenzenesulfonic acid. Dodecylbenzenesulfonic acid or other curing agents containing dodecylbenzenesulfonic acid and other acid catalyst curing agents include at least the following curing agents, for example: A 40S; ABS 100; Ambicat LE 4476; B 121; B 121 (surfactant); Bio-Soft S 100; Bio-Soft S 101; Biosoft S 126; Calsoft LAS 99; Cat 6000; Catalyst 600; Catalyst 6000; Cycat 600; DBS; Dobanic acid; Dodecylbenzenesulphonic acid; E 7256; Elfan WA Sulphonic Acid; LAS 99; Laurylbenzenesulfonic acid; Lipon LH 500; Maranil DBS; Marlon AS 3; Nacconol 98SA; Nacure 5074; Nacure 5076; Nansa 1042; Nansa 1042P; Nansa SSA; Neopelex FS; Neopelex GS; Neopelex GS-P; P 3 Vetralat; Pelex F 25; Polystep A 13; Rhodacal SSA/A; Richonic Acid B; S 100; Soft Osen 5S; Sulfosoft; Sulframin 1298; Sulframin Acid 1298; Taycacure AC 430; Taycapower L 120D; Taycapower L 121; Taycapower L 122; Ufacid K; Witco 1298; Witco 1298 Acid Soft; Witco 1298 Soft Acid; Witconic 1298 Hard Acid; Witconic 1298 Soft Acid; blocked or unblocked acid catalysts; Decotherm 255e, Nacure 2500, cycat 4040, cycat 4045, cycat 600, paratoluene sulfonic acid, amine blocked paratoluenesulfonic acid; and n-Dodecylbenzenesulfonic acid.

Surfactants or other dispersing agents may facilitate dispersion of the pigment in the vehicle. The dispersing agents may suitably include, for example, nonionic, anionic, cationic, or zwitterionic surfactants, polymers or copolymers, or reactive diluents such as aliphatic or cycloaliphatic glycidyl ethers. Nonpolar alkane or aromatic solvents, polar, aprotic solvents such as esters, ketones, amides or polar, protic solvents such as alcohols or acids may be added for rheological control.

Thermochromic pigments used herein may be purchased on commercial order, for example, from Chromatic Technologies, Inc. of Colorado Springs, Colo.

Polyester resins used herein may be purchased from suppliers including: Hexion; Lawter, Rahn USA, Rohm and Haas, Eastman, and Sartomer, for example. Polyurethane resins may also be used.

In one embodiment, a thermochromic coating formulation includes:

| Ingredient | Weight Percent of Coating |
| --- | --- |
| Pigment* | 20% to 40% |
| Vehicle | |
| Polymerizable resin or fatty acid modified alkyds | 40% to 70% |
| Dispersing agent | 0% to 5% |
| Solvent | 0% to 50% |
| Acid Catalyst Curing agent | 1% to 10% |

*Assessed by solids content upon complete drying of pigment capsules, but does not need to be dried and may be mixed as a slurry.

In a preferred embodiment, a thermochromic coating formulation includes:

| Ingredient | Weight Percent of Coating |
| --- | --- |
| Pigment* | 30% |
| Vehicle | |
| Polyester resin (Decotherm 290E) | 60% |
| Acid Catalyst Curing agent (Cycat 600) | 10% |

In another preferred embodiment, a thermochromic coating formulation includes:

| Ingredient | Weight Percent of Coating |
| --- | --- |
| Pigment* | 30% |
| Vehicle | |
| Polyurethane resin | 60% |
| Acid Catalyst Curing agent (Cycat 600) | 10% |

In one aspect, a reversible thermochromic coating for use in can and coil coatings contains a reversible thermochromic pigment in an amount from 1% to 40% by weight of the coating, and a vehicle forming the balance of the coating. The vehicle including a resin selected from the group consisting of polyester, polyurethane, urethane, acrylic acid and acrylate resins, and combinations thereof. Commercially available thermochromic pigments may be readily obtained in a variety of colors demonstrating color transition temperatures from about 5° C. and up to about 65° C. A range of color formulations may be made by mixing the pigment to include one or more of the following reversible thermochromic colors: yellow, magenta, cyan, and black. These may be further mixed to include other dyes or solid pigments that are non-thermochromic in nature. The pigment may change from a colorless state to a colored state upon cooling to the reactive temperature, or to a colored state upon heating to the reactive temperature. It is preferred that the microcapsules are formed of melamineformaldehyde that is acid catalyzed to enhance the inherent stability in polar, low molecular weight solvents having a molecular weight of about less than 100 g/mol.

When using a nonpolar solvent, the coatings can demonstrate shelf stability exceeding 14 or 45 days when stored at about 20° C. Some coating formulations demonstrate shelf stability in excess of one year.

The curing agent is generally compatible with the resin for this purpose and may be, for example, an agent that generates free radicals to initiate a polymerization reaction upon heating or upon exposure to ultraviolet light.

In a preferred embodiment, the curing agent is dodecylbenzenesulfonic acid.

Coating means include the following instrumentalities such as wherein a roller coated onto coil stock aluminum and the roll stock aluminum is subsequently formed into one or more beverage can components. These components may be selected from the group consisting of beverage can ends, beverage can tabs, bottle caps, and/or beverage container closures. The aluminum is preferably an alloy that is commonly used in canning operations, such as aluminum alloy 5182-H48. The coating process preferably occurs in one or more coats to yield a dried film with a thickness ranging from 1 mg/in$^2$ up to 5.5 mg/in$^2$.

BRIEF DESCRIPTION OF THE FIGURE

The FIGURE shows a beverage can lid with a thermochromic coating.

DESCRIPTION OF THE PREFERRED EMBODIMENTS

Thermochromic ink coatings contain, in combination, a vehicle and a pigment including thermochromic microcapsules. The thermochromic microcapsules are preferably present in an amount ranging from 1% to 50% of the coating by weight on a sliding scale. The vehicle contains a solvent that is preferably present in an amount ranging from 25% to 75% by weight of the coating. The vehicle contains a dodecylbenzenesulfonic acid curing agent present in an amount ranging from about 1% to about 10% by weight of the coating.

Pigment

Careful preparation of encapsulated reversible thermochromic material enhances coating stability in the presence of low molecular weight polar solvents that are known to adversely affect thermochromic behavior. One skilled in the art of microencapsulation can utilize well-known processes to enhance the stability of the microcapsule. For example, it is understood that increasing the cross linking density will reduce the permeability of the capsule wall, and so also reduces the deleterious effects of low molecular weight solvents. It is also commonly understood that, under certain conditions, weak acids with a pK$_a$ greater than about 2 may catalyze microcapsule wall polymerization and increase the resulting cross linking density. It is presently the case that using formic acid as a catalyst enhances solvent stability of blue thermochromic microcapsules in the presence of low molecular weight ketones, diols, and aldehydes at room temperature. Further, it is well understood that increasing the diameter of the thermochromic microcapsule can result in enhanced solvent stability.

The selection of material for use as the non-polar solvent for the thermochromic dye and color developer that is encapsulated within the thermochromic pigment determines the temperature at which color change is observed. For example, changing the solvent from a single component to a two component solvent system can shift the temperature at which full color is perceived almost 7° C. from just under 19° C. to 12° C. The present disclosure shows how to apply this knowledge in preparing resin-based vehicle coatings for use in can and coil coatings with full color temperatures, i.e., the temperature at which maximum color intensity is observed, as low as −5° C. and as high as 65° C. No adverse effects on the physical properties of the resulting coating were observed as the full color temperature was changed over the above range by the use of different straight chain alkyl esters, alcohols, ketones or amides.

Thermochromic materials including encapsulated thermochromic systems with a variety of color properties may be purchased on commercial order from such companies as Chromatic Technologies, Inc., of Colorado Springs, Colo.

Control over observed color intensity is demonstrated in several ways, generally by providing increased amounts of pigment. For a typical coating, material thickness ranges from 1 mg/in$^2$ to 6 mg/in$^2$. Very intense color is observed for coatings with thickness greater than about 3 mg/in$^2$. Increasing thermochromic pigment solids can also result in a more intense observed color even when coating thickness is decreased. However, dried film properties such as flexibility and toughness may be compromised if too much thermochromic pigment is incorporated. The optimal range of thermochromic pigment solids is within 5 to 40% by weight of the coating.

Vehicle

Physical properties of the finished coating can be significantly affected by the selection of resin to be used. When no resin is used in formulating a reversible thermochromic coating, a matte finish is achieved that is able to be formed into can ends, tabs, caps and/or other closures. While this result may be desired, the inclusion of a low viscosity, relatively low molecular weight resin, monomer, oligomer, polymer, or combination thereof, can enhance gloss and affect other physical film properties such as hardness, flexibility and chemical resistance. The resin is designed to supplement the total solids deposited on the substrate, thus impacting the physical properties of the dried film. Any resin material, monomer, oligomer, polymer, or combination thereof that can be polymerized into the commercially available can and coil coating material is suitable for inclusion in the formulation of the current reversible thermochromic can and coil coating. Acceptable classes of resins include, but are not limited to polyester, polyurethane, urethane, acrylic acid and acrylate, or other types of resin systems with suitably high solids content.

Final coating properties such as chemical resistance, hardness and flexibility can be manipulated by selection of cross linkers or curing agents. Materials that readily react with, and incorporate into, the selected resin system is suitable for inclusion as a cross linker or curing agent. Examples include, but are not limited to primary, secondary, tertiary, and cyclic aliphatic amines, blocked amines, amino resins with a range of alkylation, aromatic amines, polyamines, polyamides, amidoamines, ketimines, melamine resins, isocyanates or resins that can be cured using ultraviolet radiation and dodecylbenzenesulfonic acid. In one preferred embodiment, the curing agent is dodecylbenzenesulfonic acid. Care should be taken to balance reactivity needs with pot life and/or shelf life. For example, if the curing agent reacts too quickly with the resin, the reversible thermochromic coating may cure before the coating can be applied to the aluminum or steel substrate.

In order to ensure the reversible thermochromic coating fully cures before the coil is re-wound, accelerators and/or catalysts may be added to the coating formulation. Examples of suitable materials for use as cure accelerators or catalysts include, but are not limited to; imidazoles, amidoamines, linear phenolics, blocked and unblocked acid catalysts, isocyanates, dihydrazides or photoinitiators and dodecylbenzenesulfonic acid. In one preferred embodiment, the curing agent is dodecylbenzenesulfonic acid. Curing agents that quicken the cure rate to less than about 20 seconds but do not permanently activate the thermochromic pigments include dodecylbenzenesulfonic acid. Dodecylbenzenesulfonic acid or other acid catalyst curing agents containing dodecylbenzenesulfonic acid include at least the following acid catalyst curing agents, for example: A 40S; ABS 100; Ambicat LE 4476; B 121; B 121 (surfactant); Bio-Soft S 100; Bio-Soft S 101; Biosoft S 126; Calsoft LAS 99; Cat 6000; Catalyst 600; Catalyst 6000; Cycat 600; DBS; Dobanic acid; Dodecylbenzenesulphonic acid; E 7256; Elfan WA Sulphonic Acid; LAS 99; Laurylbenzenesulfonic acid; Lipon LH 500; Maranil DBS; Marlon AS 3; Nacconol 98SA; Nacure 5074; Nacure 5076; Nansa 1042; Nansa 1042P; Nansa SSA; Neopelex FS; Neopelex GS; Neopelex GS-P; P 3 Vetralat; Pelex F 25; Polystep A 13; Rhodacal SSA/A; Richonic Acid B; S 100; Soft Osen 5S; Sulfosoft; Sulframin 1298; Sulframin Acid 1298; Taycacure AC 430; Taycapower L 120D; Taycapower L 121; Taycapower L 122; Ufacid K; Witco 1298; Witco 1298 Acid Soft; Witco 1298 Soft Acid; Witconic 1298 Hard Acid; Witconic 1298 Soft Acid; blocked or unblocked acid catalysts; Decotherm 255e, Nacure 2500, cycat 4040, cycat 4045, cycat 600, paratoluene sulfonic acid, amine blocked paratoluenesulfonic acid; and n-Dodecylbenzenesulfonic acid.

Coating properties can also be manipulated with the inclusion of natural or synthetic waxes. For example, carnuba, polytetrafluoroethylene (PTFE), or a combination thereof may be included to affect physical film properties such as slip, coefficient of friction and abrasion resistance.

Adequate dispersion of thermochromic pigment throughout the resin is an aspect of achieving high quality coatings for commercial use. The inclusion of additional molecular or polymeric dispersing aids, such as nonionic, anionic, cationic or zwitterionic surfactants, polymers or copolymers, can ensure adequate dispersion. Active diluents, in addition to reacting with the resin selected, may also function as a dispersing aid. Furthermore, active diluents can reduce the coating viscosity and affect film flexibility and impact resistance. Suitable materials to be included as an active diluent include but are not limited to, aliphatic or cycloaliphatic glycidyl ethers, monofunctional and polyfunctional glycidyl ethers.

Final adjustments to coating rheology may be made by the addition of select solvents. A reversible thermochromic coating can be adjusted to meet rheological criteria established for use in a roller coating application. Many solvents are available for this purpose. Care should be exercised to select solvents most compatible with thermochromic pigment systems. Nonpolar solvents or solvents of low polarity are preferred. However, modifications to thermochromic pigment preparation initiated by the inventors as well as the different coating preparations available to the inventors increased the solvent options available to include low molecular weight polar solvents such as butyl carbitol acetate.

The chemical stability and shelf life of the reversible thermochromic coating may be enhanced in various ways. In one aspect, this involves separating the thermochromic pigment from organic solvents. A two-part coating system containing thermochromic pigment and resin in Part A and commercially available coating material and other solvents in Part B is then mixed immediately prior to coating aluminum or steel alloys. The shelf life of the fully mixed coating material ranges from several days to many months depending on the identity of the other components selected.

For those situations for which a two-part solution is not preferable, stability can be balanced with convenience by preparing a one-part reversible thermochromic coating. In this case, careful selection of formulation components is paramount. The use of water-based commercially available can and coil coating material enhances the shelf life stability by minimizing the amount of organic solvents in contact with the thermochromic pigment system. In one example, coating degradation was observed within 14 days when red thermochromic coatings were prepared using butyl carbitol acetate and stored at room temperature. Enhanced stability was observed when formulation components were modified as well as when stability enhanced thermochromic pigment systems were used.

The non-limiting embodiments that follow teach by way of example and prophetic example and should not be construed as unduly limiting the scope of this disclosure.

Example 1—Two Part Coating

Part A (30%)
Thermochromic pigment (any color)
Part B (70%)
Clear Coating

Example 2—Two Part Coating

Part A (60%)
45% Thermochromic Pigment (any color)
50% Polyester resin
3.3% Dispersing aid
1.7% Dodecylbenzenesulfonic acid.
Part B (40%)
85% Clear Coating
15% Solvent to reduce viscosity Example 3—Two Part Coating Part A (60%)
45% Thermochromic Pigment (any color)
50% Polyurethane resin
3.3% Dispersing aid
1.7% Dodecylbenzenesulfonic acid.
Part B (40%)
85% Clear Coating
15% Solvent to reduce viscosity Example 4

30% thermochromic pigment
60% polyester resin Decotherm 290E
10% acid catalyst (Cycat 600)

Example 5

30% thermochromic pigment
60% polyurethane resin
10% acid catalyst (Cycat 600)

The FIGURE depicts an end printing on an aluminum can using fast curing thermochromic ink formulations disclosed herein.

As opposed to placing thermochromic ink on the entire lid, it is possible to coat selected elements of the can lids, such as the just the tabs, just the closures, or both the lids and the tabs without the closures. The same coating or one having a different color and/or color transition temperature may be selectively applied to any feature of a lid, such as a surface, closure, an area surrounding closure, and/or the rim.

The tab of a can printing with thermochromic inks of the present disclosure may be manufactured from coil stock that is pre-coated with any of the coatings as described above before the tab is formed.

In one embodiment, a method for applying the thermochromic ink coating disclosed herein to the coil stock of aluminum is disclosed. As the sheet aluminum unwinds from a roll, a roller coaster receives an uncured thermochromic coating material, as described above. This places a liquid coating or film on the aluminum sheet. This film is cured, for example by the application of dodecylbenzenesulfonic acid, at curing station, and the sheet including the dried film is coiled onto a roll. This roll may then be used to make beverage can components as discussed above. It will be appreciated that additional coating operations (not shown) may be performed on a sheet of metal and/or plastic or any other container material.

Those skilled in the art will appreciate that the various embodiments described herein teach by way of example and not by limitation. These embodiments may be subjected to insubstantial changes without departing from the true scope and spirit of the invention. Accordingly, the inventors hereby state their intention to rely upon the Doctrine of Equivalents in protecting their rights in what is claimed.

What is claimed:

1. A method of coating a substrate, said method comprising:
   providing a thermochromic pigment comprising an encapsulated thermochromic system including a leuco dye, a developer, and a solvent;
   providing a vehicle including a polymerizable resin;
   providing an acid catalyst which catalyzes curing of said polymerizable resin;
   applying said thermochromic pigment, said vehicle, and said acid catalyst to said substrate to form a thermochromic coating on said substrate; and
   curing said polymerizable resin in less than about 20 seconds to provide a cured thermochromic coating having a thickness of between about 1 mg/in$^2$ and 5.5 mg/in$^2$.

2. The method of claim 1, further comprising:
   (i) combining said thermochromic pigment and said vehicle to provide a combined thermochromic pigment and vehicle;
   (ii) next, applying said combined thermochromic pigment and vehicle to said substrate;
   (iii) next, applying said acid catalyst to said combined thermochromic pigment and vehicle on said substrate to foul' said thermochromic coating on said substrate; and
   (iv) next, curing said polymerizable resin to provide said cured thermochromic coating.

3. The method of claim 1, further comprising combining said thermochromic pigment, said vehicle, and said acid catalyst prior to application to said substrate to form said thermochromic coating on said substrate.

4. The method of claim 1, further comprising providing said thermochromic pigment as a reversible thermochromic pigment which exhibits reversible thermochromic behavior.

5. The method of claim 1, further comprising providing said thermochromic pigment which achieves a color change between a temperature of about −5° Celsius to about 65° Celsius.

6. The method of claim 1, further comprising providing said polymerizable resin as one selected from the group consisting of: polyester, polyurethane, urethane, acrylic acid, and acrylate.

7. The method of claim 1, further comprising providing said acid catalyst in an amount of between about 1% to about 10% by weight of said thermochromic coating.

8. The method of claim 1, further comprising combining a conventional pigment with said thermochromic pigment.

9. The method of claim 1, further comprising providing said acid catalyst as a benezenesulfonic acid substituted with at least one alkyl group having between 1 and 20 carbons.

10. The method of claim 9, further comprising providing said acid catalyst as dodecylbenezenesulfonic acid.

11. The method of claim 1, further comprising forming said thermochromic coating on said substrate which comprises metal.

12. The method of claim 11, further comprising forming said thermochromic coating on said metal which comprises aluminum.

13. The method of claim 12, further comprising forming said thermochromic coating on said aluminum which comprises coil stock.

14. The method of claim 13, further comprising forming said thermochromic coating on said coil stock via a roller coating application.

15. The method of claim 13, further comprising coiling said coil stock into a roll following said curing of said polymerizable resin.

16. The method of claim 13, further comprising applying mechanical forces to said coil stock to form can ends, tabs, caps, and closures.

17. The method of claim 16, further comprising curing said polymerizable resin to provide said cured thermochromic coating prior to applying said mechanical forces to said coil stock to form said can ends, said tabs, said caps, and said closures.

18. The method of claim 16, further comprising providing said cured thermochromic coating on said can ends, said tabs, said caps, or said closures as a cold indicator.

19. The method of claim 16, further comprising topping a beverage can with said can ends, said tabs, said caps, or said closures.

20. The method of claim 19, further comprising filling said beverage can with a beverage prior to topping said beverage can with said can ends, said tabs, said caps, or said closures.

* * * * *